(12) United States Patent
Ren et al.

(10) Patent No.: US 10,592,636 B2
(45) Date of Patent: Mar. 17, 2020

(54) METHODS AND SYSTEMS FOR FLIGHT DATA BASED PARAMETER TUNING AND DEPLOYMENT

(71) Applicant: General Electric Company, Schenectady, NY (US)

(72) Inventors: Liling Ren, Niskayuna, NY (US); Faisal Goussous, Pinellas Park, FL (US); Meet Patel, Pinellas Park, FL (US); Filippo Liverini, Austin, TX (US); Sean Hwang, Grand Rapids, MI (US); David Lax, Grand Rapids, MI (US); Mark Darnell, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 15/462,054

(22) Filed: Mar. 17, 2017

(65) Prior Publication Data
US 2018/0268100 A1  Sep. 20, 2018

(51) Int. Cl.
*G06F 17/50* (2006.01)
*G07C 5/08* (2006.01)
*G05B 17/00* (2006.01)

(52) U.S. Cl.
CPC ...... *G06F 17/5095* (2013.01); *G06F 17/5009* (2013.01); *G07C 5/085* (2013.01); *G05B 17/00* (2013.01); *G06F 2217/16* (2013.01)

(58) Field of Classification Search
CPC .. G06F 17/5009; G06F 17/5095; G07C 5/085
(Continued)

(56) References Cited

U.S. PATENT DOCUMENTS 5,070,458 A * 12/1991 Gilmore ............... G05D 1/0005
                                                    244/180
5,606,505 A *  2/1997 Smith ................. G05D 1/0005
                                                    701/15
(Continued)

FOREIGN PATENT DOCUMENTS

EP  0719429 B1  6/1998
EP  2902987 B1  7/2016

OTHER PUBLICATIONS

Jategaonkar et al. ("Aerodynamic Modeling and System Identification from Flight Data—Recent Applications at DLR", Journal of Aircraft, 2004, pp. 681-691) (Year: 2004).*
(Continued)

*Primary Examiner* — Brian S Cook
*Assistant Examiner* — Iftekhar A Khan
(74) *Attorney, Agent, or Firm* — Buckley, Maschoff & Talwalkar LLC (57) ABSTRACT

A system, computer-readable medium, and a method including receiving flight data engine measurements for at least one engine of the specific aircraft asset; receiving flight data aerodynamics measurements for the specific aircraft asset; combining a physics based parametric aerodynamic performance model tuned for the specific aircraft asset using the flight data aerodynamics measurements and a physics based engine model tuned for the specific aircraft asset using the flight data engine measurements; calculating, based on the combined tuned aerodynamic performance model and the tuned engine model, a performance model for the specific aircraft asset as a whole; and storing a record of the calculated performance model for the specific aircraft asset for a future deployment.

16 Claims, 6 Drawing Sheets

(58) Field of Classification Search
USPC .......................................................... 703/2
See application file for complete search history.

(56) References Cited

U.S. PATENT DOCUMENTS

| | | | | |
|---|---|---|---|---|
| 5,908,176 | A * | 6/1999 | Gilyard | B64C 13/18 |
| | | | | 244/203 |
| 6,445,390 | B1 | 9/2002 | Aftosmis et al. | |
| 7,177,785 | B2 * | 2/2007 | Hartmann | G05D 1/0825 |
| | | | | 703/2 |
| 7,236,914 | B1 * | 6/2007 | Zyskowski | G06F 17/5009 |
| | | | | 703/8 |
| 7,398,182 | B2 * | 7/2008 | Petit | B64D 15/20 |
| | | | | 244/75.1 |
| 7,520,470 | B2 * | 4/2009 | Lucchesini | B64C 1/0009 |
| | | | | 244/199.1 |
| 8,467,918 | B2 * | 6/2013 | Lieu | G01C 23/005 |
| | | | | 701/14 |
| 8,504,331 | B2 * | 8/2013 | Calmels | G06F 17/5009 |
| | | | | 703/2 |
| 8,596,579 | B2 * | 12/2013 | Berard | B64D 39/00 |
| | | | | 244/135 A |
| 8,818,696 | B2 * | 8/2014 | Klooster | G08G 5/0039 |
| | | | | 701/120 |
| 9,073,623 | B1 * | 7/2015 | Suh | B64D 45/00 |
| 9,177,479 | B2 * | 11/2015 | Castillo-Effen | G08G 5/0095 |
| 9,196,165 | B2 * | 11/2015 | La Civita | G01O 21/20 |
| 9,582,636 | B2 * | 2/2017 | Foiret | G06F 17/5095 |
| 9,745,052 | B2 * | 8/2017 | Lax | B64O 19/00 |
| 9,751,614 | B1 * | 9/2017 | Nguyen | B64C 3/52 |
| 9,911,339 | B2 * | 3/2018 | Lax | G06F 17/50 |
| 10,071,818 | B2 * | 9/2018 | Kim | G07C 5/0808 |
| 10,170,007 | B2 * | 1/2019 | Borgyos | G05D 1/101 |
| 2004/0123600 | A1 * | 7/2004 | Brunell | F02C 9/00 |
| | | | | 60/773 |
| 2004/0230352 | A1 * | 11/2004 | Monroe | B64D 45/0015 |
| | | | | 701/3 |
| 2004/0260777 | A1 * | 12/2004 | Kolb | G07C 5/008 |
| | | | | 709/206 |
| 2005/0065682 | A1 * | 3/2005 | Kapadia | G07C 5/008 |
| | | | | 701/36 |
| 2007/0208465 | A1 * | 9/2007 | Gremmert | G05D 1/0607 |
| | | | | 701/4 |
| 2008/0206718 | A1 | 8/2008 | Jaklitsch et al. | |
| 2009/0037091 | A1 * | 2/2009 | Bolt, Jr. | G01O 21/00 |
| | | | | 701/10 |
| 2009/0112535 | A1 * | 4/2009 | Phillips | G06Q 10/04 |
| | | | | 703/2 |
| 2009/0112645 | A1 * | 4/2009 | Jha | G06Q 10/04 |
| | | | | 705/7.12 |
| 2009/0150012 | A1 * | 6/2009 | Agam | G01O 23/005 |
| | | | | 701/3 |
| 2009/0171634 | A1 * | 7/2009 | Bensch | G05B 13/04 |
| | | | | 703/2 |
| 2010/0174475 | A1 * | 7/2010 | Estkowski | G01C 23/005 |
| | | | | 701/120 |
| 2010/0241293 | A1 * | 9/2010 | Ganguli | G05B 23/0254 |
| | | | | 701/4 |
| 2010/0282916 | A1 * | 11/2010 | Garrido-Lopez | G05D 1/101 |
| | | | | 244/175 |
| 2012/0053916 | A1 * | 3/2012 | Tzidon | G09B 9/08 |
| | | | | 703/8 |
| 2012/0265374 | A1 * | 10/2012 | Yochum | G05D 1/0607 |
| | | | | 701/5 |
| 2013/0013134 | A1 * | 1/2013 | Lieu | G06Q 10/04 |
| | | | | 701/14 |
| 2014/0005861 | A1 * | 1/2014 | Mere | G08G 5/0039 |
| | | | | 701/3 |
| 2014/0114549 | A1 * | 4/2014 | Ziarno | G05B 23/0213 |
| | | | | 701/100 |
| 2014/0277853 | A1 * | 9/2014 | Castillo-Effen | G08G 5/0095 |
| | | | | 701/3 |
| 2015/0210405 | A1 * | 7/2015 | Casado Magana | G08G 5/0052 |
| | | | | 701/3 |
| 2016/0114903 | A1 * | 4/2016 | Claudel | B64D 45/00 |
| | | | | 701/3 |
| 2016/0140853 | A1 * | 5/2016 | Smith | G08G 5/0091 |
| | | | | 701/415 |
| 2016/0179992 | A1 * | 6/2016 | Van der Velden | G06F 17/50 |
| | | | | 703/2 |
| 2016/0203722 | A1 * | 7/2016 | Liao | G06Q 10/04 |
| | | | | 701/120 |
| 2016/0233948 | A1 * | 8/2016 | Le Bigot | H04B 7/18506 |
| 2016/0238481 | A1 * | 8/2016 | Brandon | G01M 9/08 |
| 2017/0121011 | A1 * | 5/2017 | Lax | B64C 19/00 |
| 2017/0132938 | A1 * | 5/2017 | Lax | G06F 17/50 |
| 2017/0197727 | A1 * | 7/2017 | Kim | G06F 16/23 |
| 2017/0291711 | A1 * | 10/2017 | Litwinowicz | B64D 25/00 |
| 2017/0301247 | A1 * | 10/2017 | Sherry | G08G 5/025 |
| 2017/0356925 | A1 * | 12/2017 | Berdoulat | B64D 43/00 |
| 2018/0239364 | A1 * | 8/2018 | Meulle | G08G 5/0034 |
| 2018/0268090 | A1 * | 9/2018 | Ren | G06F 17/5086 |

OTHER PUBLICATIONS

Eugene A. Morelli ("Efficient Global Aerodynamic Modeling from Flight Data", American Institute of Aeronautics and Astronautics, 2012, pp. 1-26) (Year: 2012).*

Gong et al. (Using Flight Manual Data to Derive Aero-Propulsive Models for Predicting Aircraft Trajectories,American Institute of Aeronautics and Astronautics, 2002, pp. 1-7 ) (Year: 2002).*

David H. Bridge ("Thrust and Drag Models for Performance Calculations for High-Speed Aircraft", Journal of Aircraft vol. 45, No. 4, Jul.-Aug. 2008, pp. 1358-1366) (Year: 2008).*

Gong et al., "Using Flight Manual Data to Derive Aero-Propulsive Models for Predicting Aircraft Trajectories", IAIAA's Aircraft Technology, Integration, and Operations (ATIO) Technical Forum, Aviation Technology, Integration, and Operations (ATIO) Conferences, 2002, 7 pp.

Li et al., "Integration of Engine, Plume, and CFD Analyses in Conceptual Design of Low-Boom Supersonic Aircraft", 17th AIAA Aerospace Sciences Meeting, Jan. 2009, 39 pp.

Vallone, "Parameter Estimation of Fundamental Technical Aircraft Information Applied to Aircraft Performance", Master of Science Thesis, California Polytechnic State University, Sep. 2010, 190 pp.

Tuegel et al., "Reengineering Aircraft Structural Life Prediction Using a Digital Twin", International Journal of Aerospace Engineering, vol. 2011, Article ID 154798, Aug. 2, 2011, 15 pp.

"New Aircraft Configurations Handling Qualities Studies Based on the Aerodynamic Invariant Concept", The IP.com Prior Art Database, https://priorart.ip.com/IPCOM/000211385, Oct. 3, 2011, 15 pp.

Baklacioglu et al., "Aero-Propulsive Modelling for Climb and Descent Trajectory Prediction of Transport Aircraft Using Genetic Algorithms", The Aeronautical Journal, vol. 118, No. 1199, Jan. 2014, 65 pp.

* cited by examiner

METHODS AND SYSTEMS FOR FLIGHT DATA BASED PARAMETER TUNING AND DEPLOYMENT

BACKGROUND

The field of the present disclosure relates generally to aircraft models, more particularly, to systems, devices and methods of tuning and deploying aircraft asset models for operation for a specific aircraft asset.

Traditional models intended to represent the characteristics and behaviors of an aircraft are generally static and rarely reflect true, accurate, or even up to date characteristics of a specific aircraft asset. These shortcomings may be mainly attributable to manufacturing tolerances and performance deteriorations that develop over time. Such model inaccuracies might lead to inaccurate planning and control actions with respect to business and operational objectives of a particular aircraft. Additionally, these types of model inaccuracies might also lead to unreliable monitoring of the aircraft.

Model inaccuracies may result in obscuring an ability for an entity to understand operational conditions of the aircraft and its associated systems. For example, an inaccurate model may lead to difficulties in understanding why a specific engine of the aircraft is operated in a particular manner. It might also result in hidden inefficiencies and waste. For example, a flight operational procedure used in an effort to save fuel may actually cause a fuel burn higher than the true optimal fuel burn and/or adversely impact engine life due to an inaccurate model being relied on in planning and executing the intended procedure.

Therefore, there exists a need for methods and systems that improve aircraft modelling, which can support optimized planning and operational control for a specific aircraft asset.

BRIEF DESCRIPTION

In one aspect, an embodiment of the present disclosure relates to receiving flight data engine measurements for at least one engine of the specific aircraft asset; receiving flight data flight dynamics measurements for the specific aircraft asset; receiving flight data aerodynamics measurements for the specific aircraft asset; combining a physics based parametric aerodynamic performance model tuned for the specific aircraft asset using the flight data aerodynamics measurements and the flight dynamics measurements and a physics based engine model tuned for the specific aircraft asset using the flight data engine measurements; calculating, based on the combined tuned aerodynamic performance model and the tuned engine model, a performance model for the specific aircraft asset as a whole; and storing a record of the calculated performance model for the specific aircraft asset for a future deployment.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

The assignee hereof, General Electric Company, has developed an integrated aircraft system level digital model of flight operational characteristics referred to as Aircraft Digital Twin (ACDT). The ACDT system includes, but is not limited to, the flight performance at given flight conditions and a four-dimensional (4D) flight trajectory for a particular aircraft asset. To address the issue of model accuracy for a specific aircraft asset (i.e., a particular tail number), a parametric modeling approach has been developed to allow tuning of the model using previously recorded and/or streamed data from real world flight operations from the particular tail number. In some aspects, the ACDT leverages an accurate model of the engine(s) (e.g., Engine Digital Twin) installed on the specific aircraft asset (also referred to herein simply as the aircraft) for engine performance model parameters. The ACDT also leverages the flight analytics capabilities with data recorded from the aircraft for model parameter tuning. In some aspects, the ACDT can then be deployed in one or more contexts to allow for tail number specific planning, tail specific control optimization, and reliable monitoring. In some instances, the processes and methods of the present disclosure may be used to better understand system operational conditions, as well as to recover otherwise hidden inefficiencies and flight operations waste attributable to model inaccuracies.

As referred to herein, an aircraft asset may also be referred to as a tail number since aircraft operators often identify their aircraft assets by their tail number, and in some instances herein, referred to simply as an aircraft. An aircraft asset may be defined by its configuration (i.e., asset configuration) and status (i.e., asset status). The asset configuration may include the specific airframe, specific engine(s) installed, external stores or modifications, and control systems that may influence the flight performance of the specific aircraft. The system status may include performance deterioration, damages, temporary repairs or modifications, or temporary limitations to the system performance of the specific aircraft.

In some regards, the present disclosure provides a solution for some flight data based parameter tuning and deployment problems for specific aircraft assets by establishing a system and process of combined engine model(s) and an aerodynamic model, including a method including unique operations in a model parameter tuning process that ensures that the tuned model fits the entire flight envelope and methods to deploy the tuned model parameters to systems on board the aircraft and to various systems on the ground.

Figure 1:
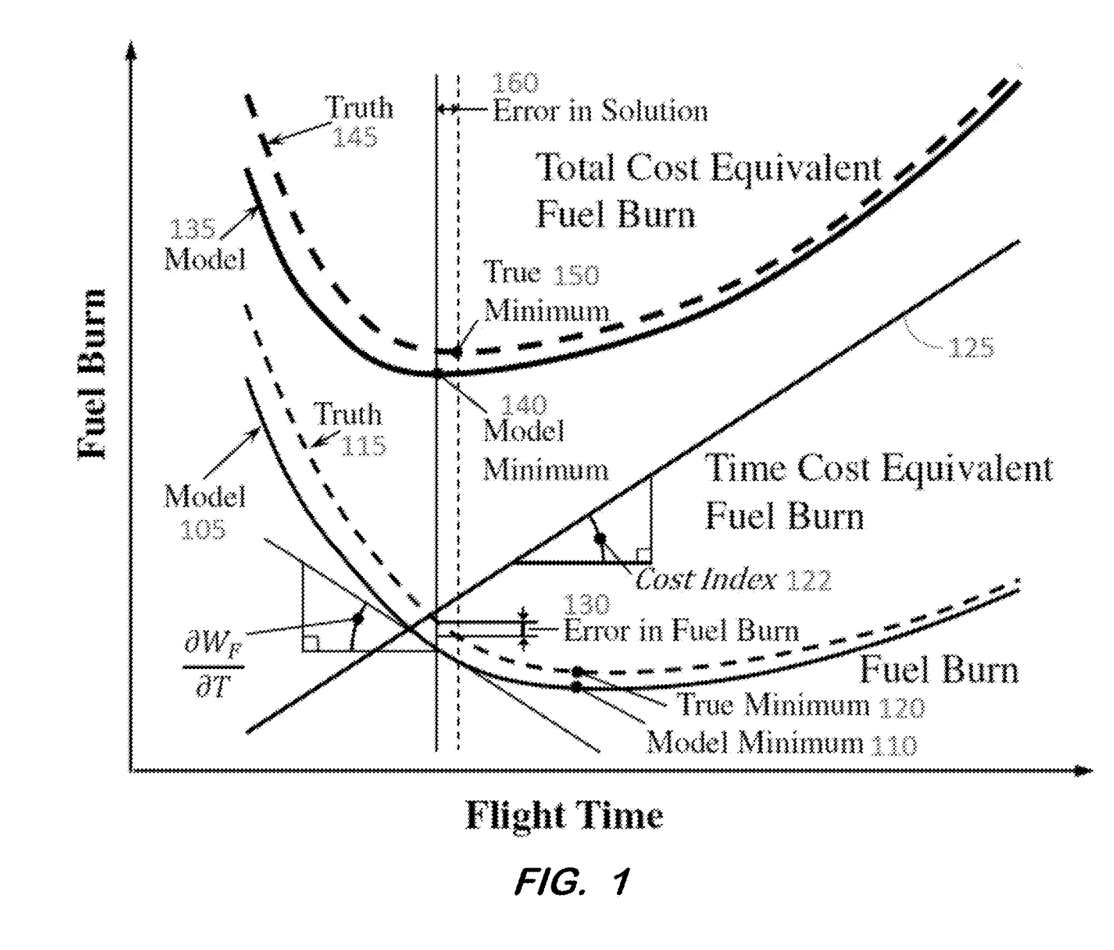
FIG. 1 is an illustrative graph depicting an example impact of model inaccuracy on one type of aircraft asset operational optimization.

Referring to FIG. 1, an illustrative graph 100 depicting an example impact of model inaccuracy on one type of aircraft asset operational optimization is shown. In some aspects, FIG. 1 demonstrates some reasons and motivations for some of the concepts and embodiments of the present disclosure. In particular, graph 100 illustrates the impact of model accuracy on operating cost optimization, including fuel and time costs. Curve 105 represents the fuel burn (y-axis) for an aircraft relative to a flight time (x-axis). The minimum fuel burn for the aircraft asset is shown at 110. If an aircraft asset were to fly a flight segment in the specific time indicated at 110, then the aircraft asset would burn the minimum amount of fuel. It is noted that curve 105 ignores the cost of time that may include costs associated with a flight crew's time, a passenger cabin crew's time, maintenance cost associated with flight time, etc. In some contexts, a cost index (CI) 122 is used to represent a time cost equivalent in terms of fuel burn. In FIG. 1, the time cost equivalent fuel burn is represented by straight line graph 125.

The fuel burn 105 plus the time cost equivalent fuel burn 125 is represented by the total cost equivalent fuel burn curve at 135. The minimum total cost equivalent fuel burn for curve 135 is located at 140. However, if the models 105 and 135 include errors, as indicated by dashed line curves 115 and 145 representing the true fuel burn and the true total cost equivalent fuel burn for the aircraft respectively, then there will be a shift or change in the optimal (e.g., minimum fuel burn or minimum total cost equivalent fuel burn) data point. The difference between the initial model curves and the actual (i.e., true) data curves represents a deviation or error. For the true fuel burn curve 115, the horizontal shift of the minimum point (from 110 to 120) may be relatively small. Yet, when the fuel burn change is added to the time cost, then the horizontal shift is more significant as seen by the model minimum 140 on the model curve 135 and the true minimum 150 on the true curve 145 of the total cost equivalent fuel burn. The horizontal shift 160 represents the error in the optimization solution. If this error 160 is not accounted for, the actual fuel burn will have an increase 130 measuring the difference on the true fuel burn curve 115. The change seen is not only due to actually operating the aircraft with a different fuel burn rate but also operating at the wrong supposed optimal (i.e., minimum cost) flight time or speed. That is, the deviation between curves 135 and 145 indicates the (in)accuracy of the model but also the impact of the model's (in)accuracy on the optimization.

Figure 2:
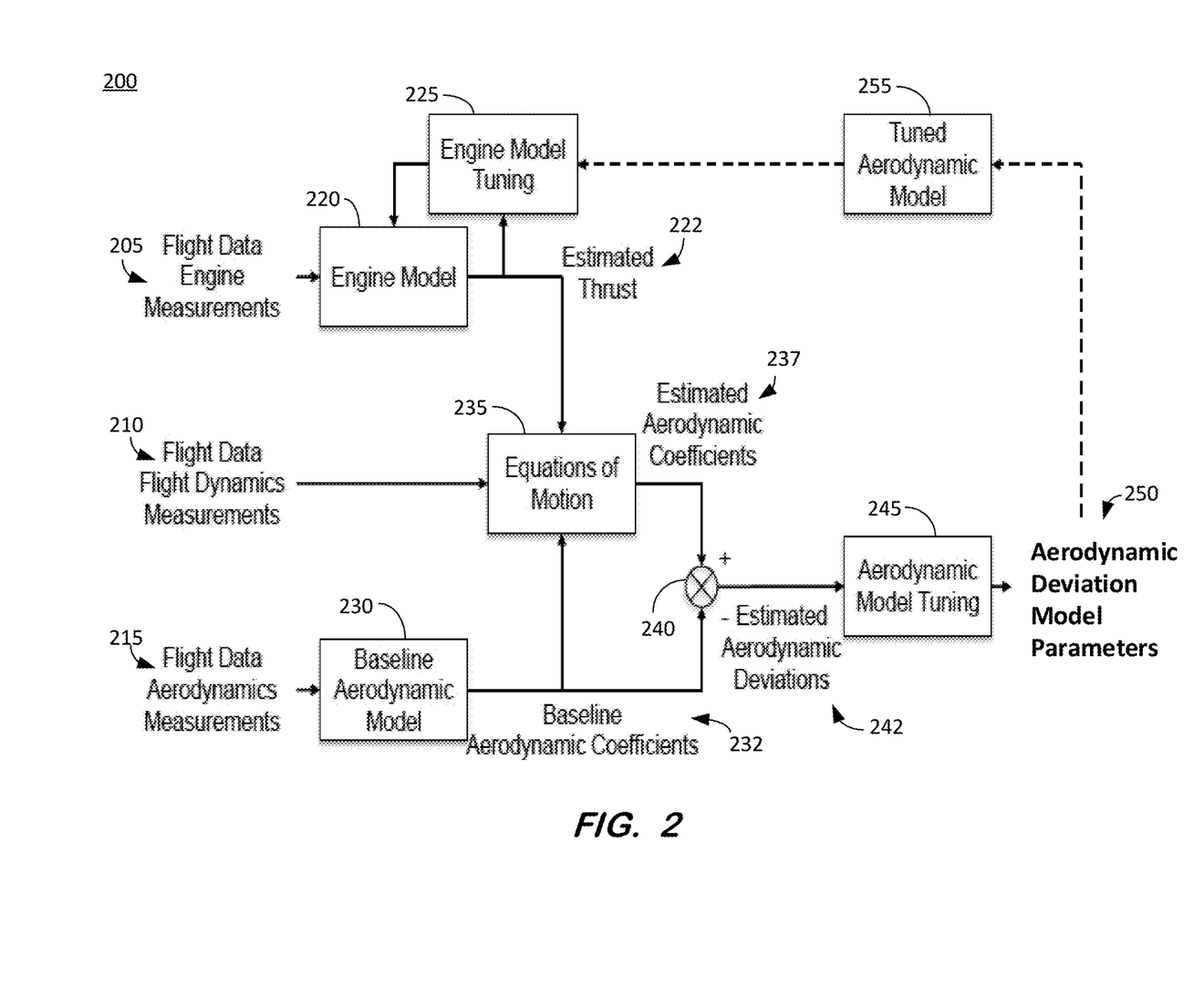
FIG. 2 is an illustrative example of a model tuning process or framework, according to some aspects herein.

FIG. 2 is an illustrative depiction of a framework or process 200 for model tuning, according to some embodiments herein. Model tuning process 200 combines a physics based engine model (i.e., an engine model) and a physics based parametric aerodynamic performance model (i.e., an aerodynamic model), both of which are tuned using recorded or streamed flight data to obtain a highly accurate performance model specific to, as a whole, a particular aircraft asset. The performance model may be represented by an Aircraft Digital Twin (ACDT).

Referring to FIG. 2, the aerodynamic model comprises a reference, baseline aerodynamic model 230 that captures a behavior of a nominal or average aircraft of a given type and a parametric model (not shown) that can be tuned using recorded flight data that accurately captures a deviation between the performance of the specific asset and the reference baseline model.

Engine model 220 receives flight data engine measurements 205. The flight data engine measurements may be used to tune engine model 220, as illustrated by engine model tuning 225. In some embodiments, engine model 220 may be directly tuned without considering an aerodynamic performance model of the specific aircraft using the relevant flight data engine measurements 205 and flight conditions. The engine measurements and flight conditions might include, for example, latitude and longitude, calibrated airspeed (CAS)/Mach number, static air temperature (SAT)/total air temperature (TAT), engine throttle lever angle (TLA), engine fan speed (N1), engine pressure ratio (EPR), fuel flow, exhaust as temperature (EGT), engine bleed, engine power, and engine mode.

In some embodiments, a physics based engine model herein might include models such as the Numerical Propulsion System Simulation (NPSS), a mathematical presentation derived from the performance of NPSS or experimental data, and a model of any other form. In some embodiments, a data driven model may be used instead. The model can be tuned using recorded flight data to provide, for example, a thrust output that is truthful to the given operating condition and each of the engine(s) installed on the aircraft.

In some instances, the engines for an aircraft with multiple engines may be tuned separately. The tuning of the multiple engines may be accomplished sequentially or at least partially in parallel. In some instances, not all of the measurements are used at the same time, as indicated by the interaction of engine model 220 and engine model tuning 225.

In some embodiments, a number of different or various engine model parameters may be tuned by using relevant data samples. The data samples may be selected according to one or more different processes. Engine model tuning 225 may be accomplished using a collection of data samples using regression or other optimization techniques. In some embodiments, engine model 220 may be tuned using streamed data, where some measurements might be estimated using filters (e.g., a Kalman filter).

In some embodiments, a tuned engine in process 200 may be checked for consistency when tuned aerodynamic performance parameters become available. As illustrated by the dotted line delivering aerodynamic deviation model parameters 250 via tuned aerodynamic model 255 to engine tuning module 225, engine model parameters such as engine idle parameters may be tuned using idle descent data samples and aerodynamic model parameters tuned using cruise data samples.

In some embodiments, recorded flight data may be sorted by flights conducted by the specific aircraft asset in chronological order and further grouped by asset configuration changes. The asset configuration changes might include, for example, engine replacements or swaps, an installation of a satellite antenna, and other changes. This categorization of the flight data may be used to ensure that the tuning will target specific asset configurations, as opposed to a mix of different configurations that could result in a reduced accuracy for a model.

For each asset configuration group, the flight data may be further grouped by time periods of a selected scale, where the scale can be in terms of calendar days, number of flight cycles, number of flight hours, or a combination of one or more of these aspects. This grouping might allow for the parameter tuning process to track the asset's status evolution over time. In some embodiments where there might be asset configuration change information, grouping with time periods of different scale could help to detect asset configuration changes that are unknown to the parameter tuning process.

In some regards and independent of or related to the chronological grouping process, a subset of measurements might be selected from all available measurements in the flight data, based on the physics laws that define the relationship(s) between measurements and flight performance parameters. The selection of measurements might also be based on some sensitivity of flight performance parameters to individual measurements. This aspect might be particularly useful when alternative relationships can be used, for example determining the lift from the angle of attack (AOA) assuming a linear relationship between the two, or determining the lift from the acceleration of the aircraft in given directions. The selection of measurements might, in some instances, also be based on a reliability of individual measurements that can be inspected by comparing a time history of one measurement with another measurement related thereto by a physics law. For example, some measurements may contain higher levels of noise due to either a sensor performance or due to some intrinsic characteristics of the physics phenomenon. Yet, in other cases, some measurements might be used in redundant relationship or equations to reduce bias and noise in modeling results. In some instances and embodiments, measurements might be selected for an aerodynamic model and an engine model herein separately or for the aircraft asset as a whole.

In some embodiments, data snippets ranging from individual data points to an entire set of data points may be selected from the flight data for each individual flight as data samples for use in model tuning herein. Examples of such data snippets may include data for flight segments appearing to be steady state climb, cruise, descent, and coordinated turn. Some examples of such data snippets may also include segments of given aerodynamic configurations such as configurations with flaps, slats, or landing gear extended; segments with engines in given operational modes; and unique combinations of these conditions. The selection of data samples may be performed separately for the aerodynamic model, separately for the engine model, or for the aircraft asset as a whole.

The sorting, grouping, and selecting of data disclosed herein may be performed, in some embodiments, automatically with automatically determined or user entered parameters using a flight data analytics platform.

Referring again to FIG. 2, flight data aerodynamic measurements 215 are provided to the baseline aerodynamic model 230. Baseline aerodynamic model 230 generates baseline aerodynamic coefficients 232.

Equations of motion 235 for the specific aircraft receive and use sample flight data dynamics measurements 210, estimated thrust 222 from the tuned engine model, and baseline aerodynamic coefficients 232 calculated from baseline aerodynamic model 230 to generate estimated aerodynamic coefficients 237. Sample measurements of flight data flight dynamics measurements 210 and flight data aerodynamics measurements 215 include, for example, the latitude and longitude, pressure altitude, calibrated airspeed (CAS)/Mach number, static air temperature (SAT)/total air temperature (TAT), flight path angle (FPA), angle of attack (AOA), side slip angle, deflection of aerodynamic surfaces, landing gear position, aircraft mass, center of gravity (CG), accelerations, wind speed and direction, etc. In some embodiments regarding a collection of data samples, a collection of estimated data points may be produced for a range of flight conditions, such as flight conditions defined by altitude, Mach number, and other parameters. In some aspects, the use of the baseline aerodynamic coefficient(s) may help improve the accuracy of the aerodynamic coefficients estimation. It is noted that not all of the measurements disclosed as being possibly used in determining the estimated aerodynamic coefficients need be used in all instances and/or at the same time.

Estimated aerodynamic deviations 242 can be obtained by comparing, via summation function 240, estimated aerodynamic coefficients 237 and baseline aerodynamic coefficients 232. The baseline aerodynamic coefficients may be calculated using sample measurements relevant to aerodynamics (i.e., flight data aerodynamics measurements 215) such as, for example, pressure altitude, calibrated airspeed (CAS)/Mach number, static air temperature (SAT)/total air temperature (TAT), angle of attack (AOA), side slip angle, deflection of aerodynamic surfaces, landing gear position, aircraft mass, center of gravity (CG), or estimated or calculated lift coefficient. For a collection of estimated aerodynamic coefficient samples, a collection of estimated aerodynamic deviation may be produced for a range of flight conditions, characterized by, for example, altitude, Mach number, and other parameters.

Aerodynamic deviation model 245, forming part of the physics based aerodynamic performance model herein, can then be tuned using the estimated aerodynamic deviation data points to define a set of parameters that define a parametric model that defines an error (i.e., deviation) for all operating points for the specific aircraft over the entire flight envelope. In some embodiments, the tuning of the aerodynamic deviation model may use regression processes or optimization methods.

In an instance of a single parameter model (e.g., a simple percentage drag factor), the parameter can be obtained for each sample data point without using a regression or optimization methods. A distribution of the single parameter can be obtained from a collection of sample data points.

The aerodynamic deviation model parameters may be fed back, through the tuned aerodynamic model at 255, to verify the consistency of the tuned engine model at 225, as well as to assist in tuning the engine model using some of the aerodynamic parameters, where relevant.

In some embodiments and for a same aircraft asset, the tuning process of process 200 may be performed for each of a series or plurality of time periods, resulting in a series of model parameter sets, one set for each time period.

In some embodiments, aggregated deviations can be obtained based on each model parameter set to track aircraft asset status change over time. Tracking an aircraft asset's performance over time may reveal instances of aircraft asset performance deterioration and recovery.

During some operations or due to limited data collected from an aircraft asset, either the sample data points for tuning models may be clustered in a relatively small region in a flight condition space or a limited number of small regions. As such, some parametric models tuned using some data collections might be biased towards where the data points reside, instead of the true status of the aircraft asset. In some of these instances, it may be possible to tune model accurately where the data points exist and rather inaccurately tune the model where no data points exist.

Figure 3:
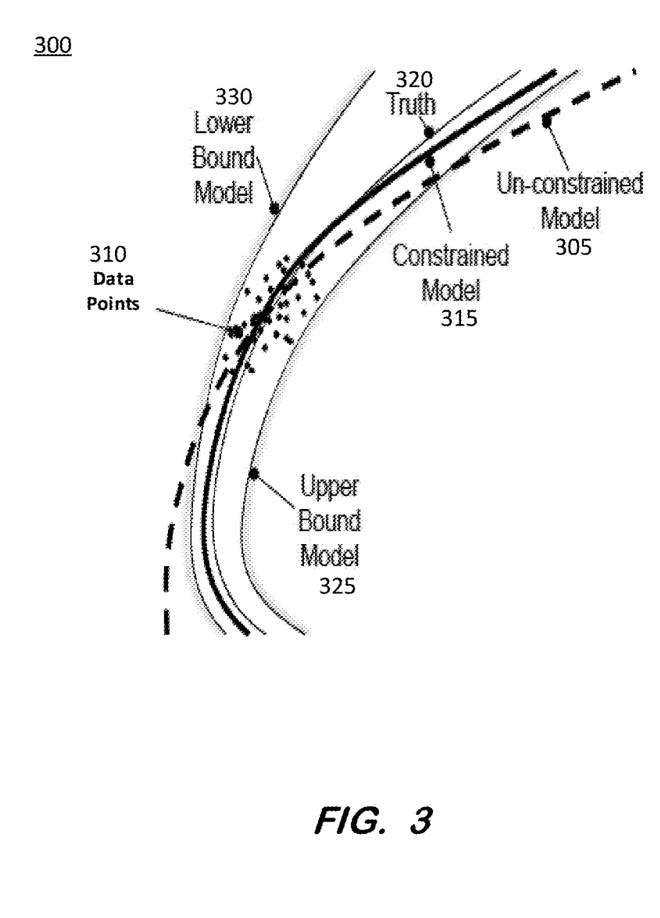
FIG. 3 is an illustrative depiction of one example of an unconstrained model and a corresponding constrained model, according to some embodiments herein.

FIG. 3 is an illustrative graph 300 highlighting some aspects addressed by the present disclosure, including a model tuning bias. In FIG. 3, dashed line 305 represents a un-constrained model that is tuned directly from available data points. The un-constrained model is not representative of a specific aircraft asset over the whole range of operating conditions, even though it may represent the aircraft asset in the region of the clustered data points 310. Data points 310 may each represent a measurement of the specific aircraft. However, as the example shown in FIG. 3 illustrates, data points 310 are clustered in a relatively small area. Due to noise in the data, un-constrained model 305 may deviate from the truth represented by line 320 outside the area where data points 310 may be clustered. The farther away a flight condition is, the larger the deviation could be. Knowledge of the general behavior of the baseline model or the general behavior of the deviation model or both may be used to determine, estimate, infer, or characterize an error to determine a corrected model represented by line 315. In some embodiments, from the distribution of data points 310 and the knowledge of the general behavior of the model may be used to constrain model 315 such that it is closer to the truth represented by line 320. For example, an upper bound model 325 and a low bound model 330 may be used to bound aerodynamic deviation or engine model metrics. The parameter sets of the upper bound model 325 and the low bound model 330 may be further used to derive parameter constraints that are known to confine the model behavior in a reasonable space, wherein the parameter constraints can be used in a model tuning process (e.g., process 200). For example, this strategy may be used to apply a simple fixed percent deviation hyper surfaces to bound aerodynamic model deviations from flight data samples, as shown in FIG. 3 by upper bound 325 and lower bound 330 representing an upper bound percent deviation and a lower bound percent deviation respectively, relative to the baseline model.

Figure 4:
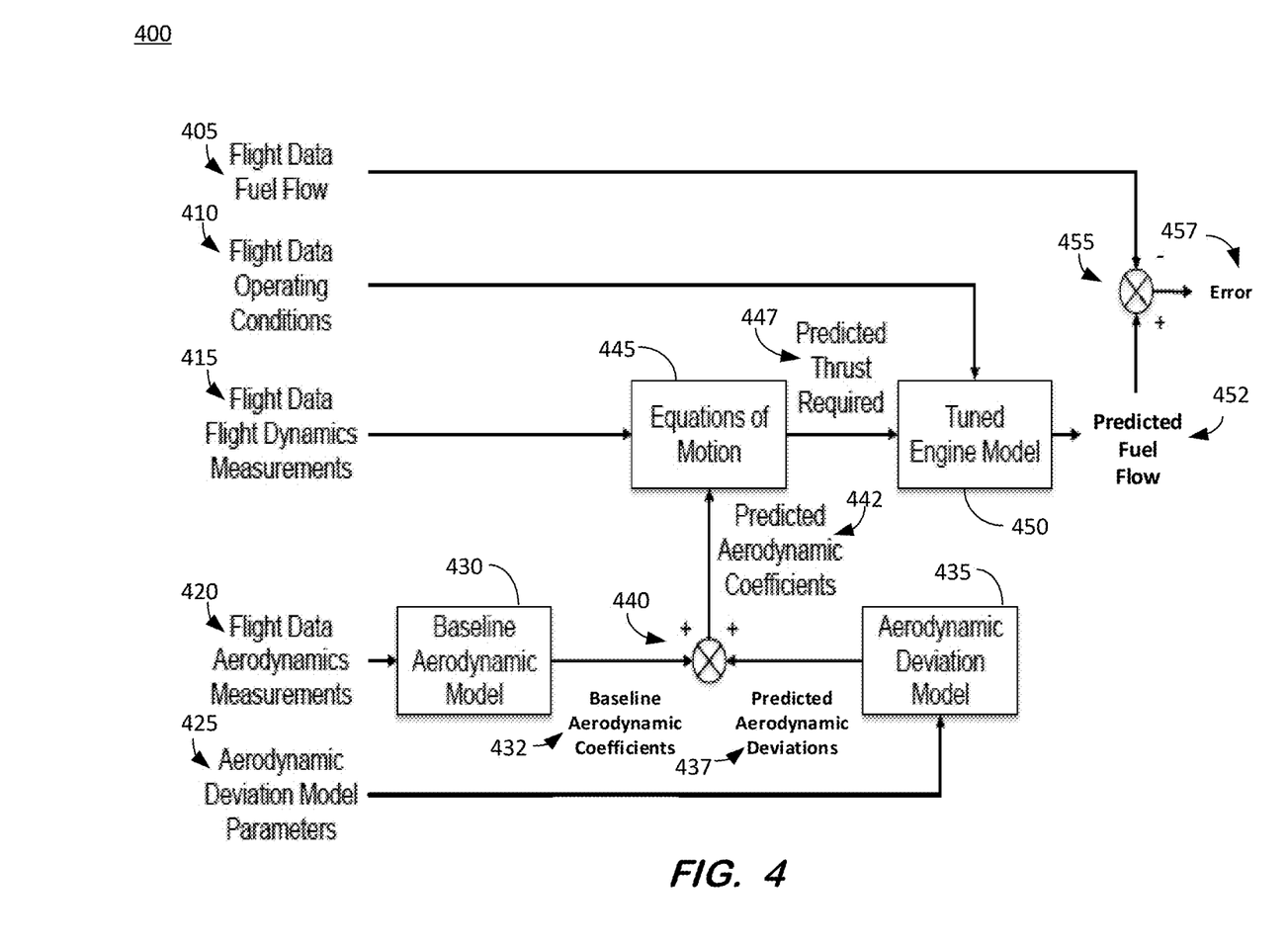
FIG. 4 is an illustrative example of a model prediction process, according to some aspects herein.

FIG. 4 is an illustrative example of a model prediction process 400, according to some aspects herein. In some aspects, process 400 may use tuned models from a model tuning process, such as process 200 of FIG. 2. The example of FIG. 4 can use tuned aerodynamic and tuned engine models to predict a flight performance such as, for example, a cruise operating cost model prediction. The data inputs used in process 400 may be sourced from a fast-time or real-time flight simulator and a selected subset of recorded flight data measurements. The data inputs include flight data fuel flow 405, flight data operating conditions 410, flight data flight dynamics measurements 415, flight data aerodynamics measurements 420, and aerodynamics deviation model parameters 425. In an instance a flight simulator is used, particularly if an optimization method is included in the simulator, the predicted error may indicate an accuracy of the tuned model, as well as the impact of the model's accuracy on the optimization (as illustrated in FIG. 1). In the instance the model performance prediction process uses recorded flight data as shown in FIG. 4, the predicted error may indicate the accuracy of the tuned model.

Baseline aerodynamic model 430 uses flight data aerodynamics measurements 420 to get baseline aerodynamic coefficients 432. The baseline aerodynamic coefficients are combined with predicted aerodynamic deviations 437 that are calculated by the aerodynamic deviation model 435 based on the aerodynamic deviation model parameters 425 to obtain predicted aerodynamic coefficients 442. In some embodiments, an aggregated aerodynamic deviation of the specific aircraft model can be obtained directly from the aerodynamic deviation model 435 by collecting predicted aerodynamic deviations 437 and then integrating over time (e.g., if fuel flow is the main concern), over distance (e.g., if fuel mileage is the main concern), or over any other variables as appropriate to an objective of the tuning process.

The predicted aerodynamic coefficients 442 and the flight data flight dynamics measurements 415 are used by the equations of motion 445 to generate a predicted thrust required 447. The predicted thrust is in turn used by tuned engine model 450 to produce the predicted fuel flow at 452. The predicted fuel flow is compared to the flight data fuel flow 405 at 455 to generate an error prediction 457.

The error prediction such as that shown in FIG. 4 (or that from a simulation), may be calculated for each data point. In some aspects, aggregated model accuracy may be obtained for a large number of flights if the flights correspond to the type of use of a subject aircraft asset. Alternatively, a representative flight of a full flight profile may be used.

In some embodiments, it may be desired to maintain and track aircraft asset status changes over a period time. The status changes can be represented by changes in model parameters and further visualized by aggregated deviations. These changes might provide information for obtaining more accurate and reliable models in the future. In some regards, as the asset's configuration changes (e.g., engine replacement and engine swap), the engine parameters and engine parameter history might be part of an engine log that accompanies the engine so that changes to the engine status can be continuously tracked and maintained. A copy of the engine parameter and engine parameter history might also be kept with the airframe so that model tuning results can be compared with different engines to help maintain consistency and model stability.

It may generally be assumed that an asset's engine performance and aerodynamic performance might gradually change over time. However, if a sudden change in model parameters or aggregated deviation is observed through a model tuning process herein between time periods defined by flight cycles or flight profile segments during a same flight, then such changes might be an indication of sudden damages to the aircraft asset (e.g., airflow leaks or engine damages). In this manner, alone or in conjunction with other types of available information, one or more of the model tuning features disclosed herein might be used to detect anomalies in the operation of specific aircraft assets. In some embodiments, a tuned model may be deployed to support a number of different applications or use cases.

Figure 5:
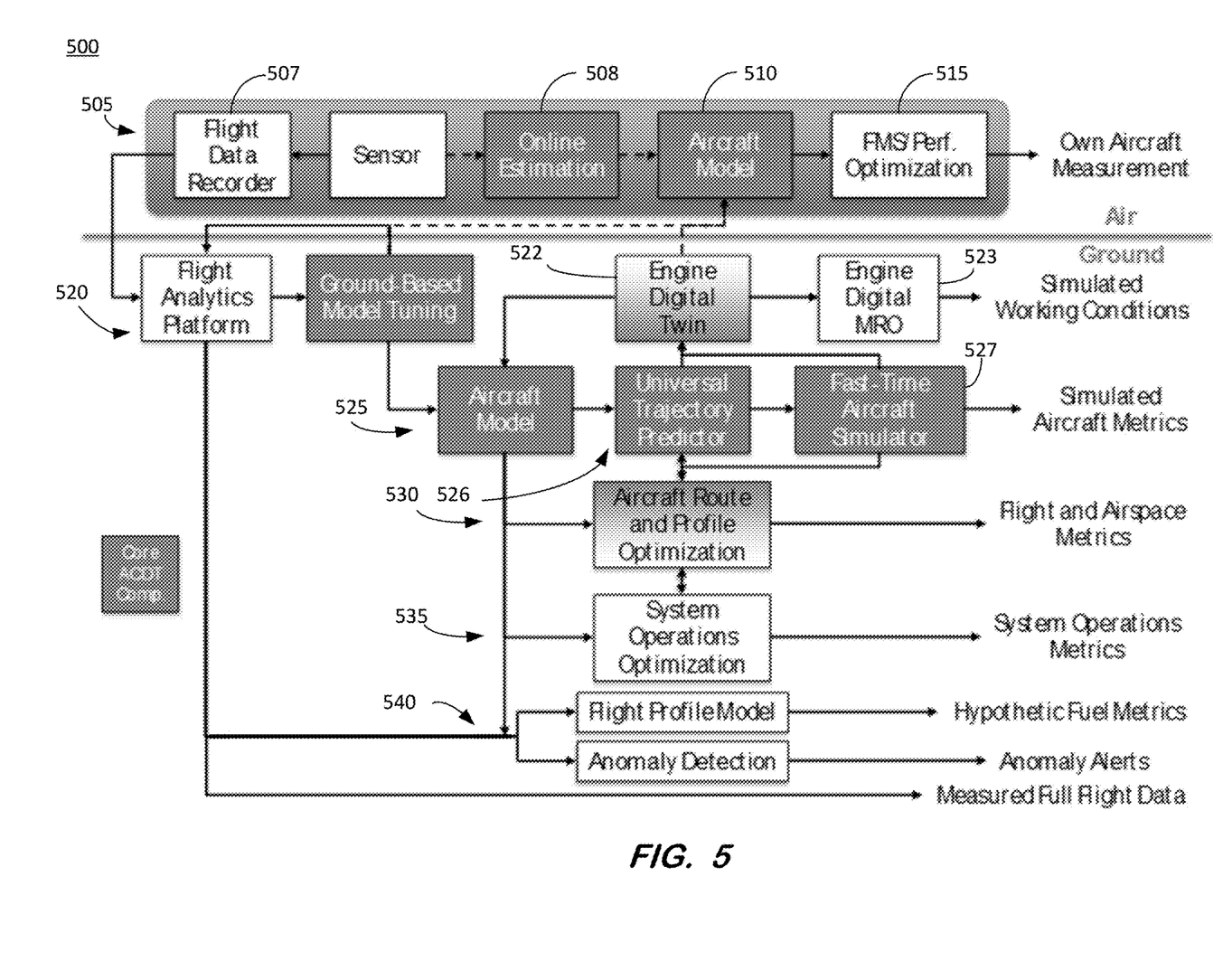
FIG. 5 is an illustrative depiction of an example information flow and deployment use-cases, according to some embodiments herein.

FIG. 5 is an illustrative framework 500 encompassing some aspects of model tuning and use cases (i.e., deployments of the models) herein. Framework 500 may include periodically deploying models to an aircraft asset, such as to an onboard system 505 for Flight Management System (FMS) performance optimization 515 where model tuning is performed on the aircraft. The models herein may also be deployed to a ground based system where model tuning can be accomplished by ground based systems and the tuned model parameters can be periodically transmitted to the aircraft.

Referring to FIG. 5, each generally horizontal row therein represents a deployment embodiment. At 505 an aircraft deployment is illustrated where measurements of the aircraft may be generated. In one embodiment, measurements from sensors 502 may be fed into the online estimation (tuning) module 508 to tune model parameters. The tuned model parameters can then be fed to the aircraft model 510 for FMS performance optimization 515. In another embodiment, at 520, a flight analytics platform collects data downloaded from the aircraft, e.g., via the airborne flight data recorder 507 and fed to the ground based model tuning 521. An engine digital twin 522 provides a tuned engine model. Tuned aerodynamic model parameters and tuned engine model parameters may be periodically transmitted to the airborne aircraft model 510 for FMS performance optimization 515. In yet another embodiment, tuned aerodynamic model parameters and tuned engine model parameters may also be periodically fed to the ground based tail specific aircraft model 525. In yet another embodiment, at 526, a universal trajectory predictor (UTP) may use the tail specific model 525 to predict a trajectory and work with a fast-time aircraft simulator 527 to generate tail specific simulated flight metrics. In yet another embodiment, predicted trajectory from 526 and simulated aircraft metrics from 527 may be fed back to the engine digital twin. The engine model may be deployed to, in one example, understand how an engine is being used to better maintain and repair the engine (e.g., maintenance, repair and overhaul module, MRO, 523). In yet another embodiment, at 530 the models may be deployed to ground based systems to optimize tail specific aircraft route and profile optimization and generate flight and airspace metrics. In still yet another embodiment, at 535 the models may be deployed to the ground based system to optimize fleet or network system operations and generate metrics related thereto. In another embodiment, at 540 the models may be deployed to the flight analytics platform for a tail specific prediction of profile fuel metrics and anomaly detection. In some embodiments, deployments may be achieved by deploying the parametric models herein to a corresponding system and periodically transmitting tuned and verified model parameters to the deployed systems.

Figure 6:
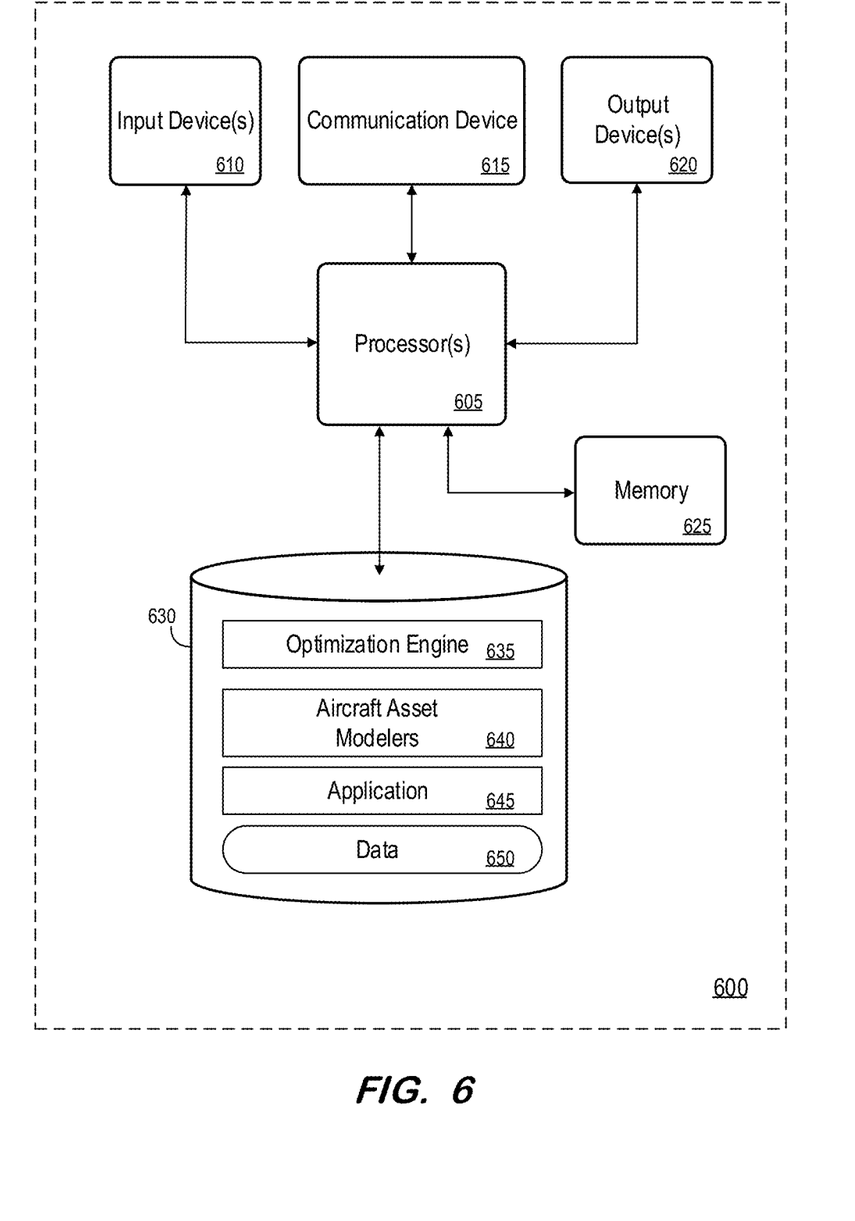
FIG. 6 is an illustrative depiction of a block diagram of a system or device that can support some processes disclosed herein.

FIG. 6 is an illustrative block diagram of apparatus 600 according to one example of some embodiments. Apparatus 600 may comprise a computing apparatus and may execute program instructions to perform any of the functions described herein. Apparatus 600 may comprise an implementation of server, a dedicated processor-enabled device, and other systems, including aircraft deployed systems and systems deployed in, for example, an external computational asset or facility, in some embodiments. Apparatus 600 may include other unshown elements according to some embodiments.

Apparatus 600 includes processor 605 operatively coupled to communication device 615 to communicate with other systems, data storage device 630, one or more input devices 610 to receive inputs from other systems and entities, one or more output devices 620 and memory 625. Communication device 615 may facilitate communication with other systems and components, such as other external computational assets, an air traffic control network, and an aircraft. Input device(s) 610 may comprise, for example, a keyboard, a keypad, a mouse or other pointing device, a microphone, knob or a switch, an infra-red (IR) port, a docking station, and/or a touch screen. Input device(s) 610 may be used, for example, to enter information into apparatus 600. Output device(s) 620 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 630 might store flight data plans, optimized controls command by some embodiments herein, etc.

Optimization engine 635, aircraft modelers 640, and application 645 may comprise program instructions executed by processor 605 to cause apparatus 600 to perform any one or more of the processes described herein, including but not limited to aspects disclosed in FIGS. 2 and 3. Embodiments are not limited to execution of these processes by a single apparatus.

Data 650 (either cached or a full database) may be stored in volatile memory such as memory 625. Data storage device 630 may also store data and other program code for providing additional functionality and/or which are necessary for operation of apparatus 600, such as device drivers, operating system files, etc. Data 650 may include performance data related an aircraft that may be used in future model tuning for a specific aircraft asset for optimization purposes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method, implemented by a processor, of model tuning for a specific aircraft asset, the method comprising:
  receiving, by a processor, at least one of recorded and streamed flight data engine measurements for at least one engine of the specific aircraft asset;
  receiving, by the processor, at least one of recorded and streamed flight data flight dynamics measurements for the specific aircraft asset;
  receiving, by the processor, at least one of recorded and streamed flight data aerodynamics measurements for the specific aircraft asset;
  tuning, by the processor, a physics based parametric aerodynamic performance model for the specific aircraft asset using the flight data flight dynamics measurements and the flight data aerodynamics measurements and a physics based engine model for the specific aircraft asset using the flight data engine measurements, the tuning of the engine model and the aerodynamic performance model executed for each of a plurality of time periods to obtain a series of model parameter sets, one for each of the plurality of time periods;
  aggregating deviations of the tuned engine model and the tuned aerodynamic performance model based on each of the model parameter sets to track a status of the specific aircraft asset's status over a period of time;

combining, by the processor, the tuned aerodynamic performance model for the specific aircraft asset and the tuned engine model for the specific aircraft asset;

calculating, by the processor based on the combined tuned aerodynamic performance model and the tuned engine model, a performance model for the specific aircraft asset as a whole;

storing a record of the calculated performance model for the specific aircraft asset for a future deployment in a tangible computer-readable memory;

deploying the record of the calculated performance model for the specific aircraft asset to at least one of the specific aircraft asset and a ground-based system; and optimizing at least one of performance of the aircraft based on the record of the calculated performance model deployed to the specific aircraft asset and one or more of aircraft route and profile for the specific aircraft asset based on the record of the calculated performance model deployed to the ground-based system.

2. The method of claim 1, wherein the flight data engine measurements, flight data flight dynamics data, and the flight data aerodynamics measurements are at least one of recorded data, streamed data, and a combination thereof.

3. The method of claim 1, wherein the aerodynamic performance model comprises a reference baseline model to capture a behavior of a nominal or average aircraft of a given type and a parametric model tunable using flight data to capture a deviation between a performance of the specific aircraft asset.

4. The method of claim 3, wherein the engine model comprises a physics based model of at least one of a numerical propulsion system simulation (NPSS), a mathematical presentation derived from a behavior of NPSS or experimental data, and combinations thereof.

5. The method of claim 1, wherein the engine model comprises an instance thereof for each engine installed on the specific aircraft asset.

6. The method of claim 1, wherein the engine model provides a thrust output truthful to actual operating conditions of the specific aircraft asset.

7. The method of claim 1, wherein the performance model for the specific aircraft asset is defined by operating conditions and accurate for an entire flight envelope for the specific aircraft asset.

8. The method of claim 1, further comprising tracking a performance of the specific aircraft asset between flights and over a period of time.

9. The method of claim 1, wherein the specific aircraft asset is defined by its asset configuration and asset status.

10. The method of claim 1, wherein measurements are selected from the flight data engine measurements and the flight data aerodynamics measurements for the engine model and the aerodynamics model, respectively, separately or for the specific aircraft asset as a whole.

11. The method of claim 1, wherein aerodynamic coefficients for the determining the aerodynamic model are estimated by solving equations of motions for the specific aircraft asset using a collection of sample measurements relevant to flight dynamics for the specific aircraft asset.

12. The method of claim 1, wherein the engine model is tuned exclusive of considerations of the aerodynamic performance model.

13. The method of claim 11, further comprising determining estimated aerodynamic deviations for the aerodynamic performance model by comparing the estimated aerodynamic coefficients and baseline coefficients of a baseline aerodynamic model of the aerodynamic performance model.

14. The method of claim 13, wherein the aerodynamic performance model comprises an aerodynamic deviation model and the aerodynamic deviation model is tunable using the estimated aerodynamic deviations.

15. The method of claim 1, further comprising deploying the performance model to at least one of a system onboard the specific aircraft asset and a ground based system.

16. The method of claim 15, wherein the deploying comprises:

deploying the engine model and the aerodynamic model to one of the onboard system and the ground based system; and transmitting tuned model parameters, at least periodically, to the deployed engine model and aerodynamic model.

* * * * *